United States Patent
Choi et al.

(10) Patent No.: US 9,635,336 B2
(45) Date of Patent: Apr. 25, 2017

(54) CONTENT OUTPUT SYSTEM AND CODEC INFORMATION SHARING METHOD IN SAME SYSTEM

(75) Inventors: Jeong Il Choi, Yongin-si (KR); Seung Ku Lee, Suwon-si (KR); Se Hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 13/700,570

(22) PCT Filed: Mar. 16, 2011

(86) PCT No.: PCT/KR2011/001840
§ 371 (c)(1),
(2), (4) Date: Nov. 28, 2012

(87) PCT Pub. No.: WO2011/115424
PCT Pub. Date: Sep. 22, 2011

(65) Prior Publication Data
US 2013/0287371 A1    Oct. 31, 2013

(30) Foreign Application Priority Data

Mar. 16, 2010 (KR) .................. 10-2010-0023347
Mar. 16, 2010 (KR) .................. 10-2010-0023348

(51) Int. Cl.
*H04N 9/87* (2006.01)
*H04L 29/06* (2006.01)
(Continued)

(52) U.S. Cl.
CPC ........... *H04N 9/87* (2013.01); *H04L 65/4084* (2013.01); *H04L 69/24* (2013.01);
(Continued)

(58) Field of Classification Search
CPC ...................................... H04N 9/87
See application file for complete search history.

(56) References Cited

U.S. PATENT DOCUMENTS 7,159,224 B2 * 1/2007 Sharma ............ G06F 8/10
719/310
8,422,851 B2 * 4/2013 Mazzaferri ......... H04L 29/06
386/239

(Continued)

FOREIGN PATENT DOCUMENTS

CN    1830174 A     9/2006
CN    100542284 C   9/2009
(Continued)

*Primary Examiner* — Jay Patel
*Assistant Examiner* — Irfan Habib
(74) *Attorney, Agent, or Firm* — Jefferson IP Law, LLP

(57) ABSTRACT

A contents output system capable of outputting contents and a method for sharing codec information for outputting the contents in the system are provided. The method for sharing codec information in a contents output system includes sharing, when a media server, a media renderer for outputting contents, and a control point are connected, codec information provided by the media server and the codec information of contents playable by the media renderer, and providing, at the media server, the contents to the media renderer according to the shared codec information.

12 Claims, 12 Drawing Sheets

(51) Int. Cl.
*H04N 21/436* (2011.01)
*H04N 21/658* (2011.01)
*H04W 4/18* (2009.01)
*H04W 88/18* (2009.01)

(52) U.S. Cl.
CPC ... *H04N 21/43615* (2013.01); *H04N 21/6582* (2013.01); *H04W 4/18* (2013.01); *H04W 88/181* (2013.01)

(56) References Cited

U.S. PATENT DOCUMENTS

| | | | | |
|---|---|---|---|---|
| 8,545,331 | B2 * | 10/2013 | Reams | H04N 5/44513 463/42 |
| 8,645,487 | B2 * | 2/2014 | Sung | H04L 12/281 707/602 |
| 8,958,483 | B2 * | 2/2015 | Dhawan | H04N 9/87 375/240.01 |
| 9,338,420 | B2 * | 5/2016 | Xiang | G11B 27/031 |
| 9,407,895 | B2 * | 8/2016 | Cho | H04N 21/41407 |
| 9,462,249 | B2 * | 10/2016 | Goldberg | H04N 9/87 |
| 9,485,486 | B2 * | 11/2016 | Watanabe | H04N 21/8543 |
| 2002/0095359 | A1 * | 7/2002 | Mangetsu | G06Q 30/06 705/30 |
| 2003/0046338 | A1 * | 3/2003 | Runkis | G06Q 30/02 709/203 |
| 2003/0236895 | A1 * | 12/2003 | Ohkubo | H04N 7/17318 709/229 |
| 2004/0243700 | A1 * | 12/2004 | Weast | G06F 17/30017 709/224 |
| 2004/0267965 | A1 * | 12/2004 | Vasudevan | G06F 17/30905 709/250 |
| 2005/0010963 | A1 * | 1/2005 | Zeng | H04L 29/06 725/131 |
| 2006/0212531 | A1 * | 9/2006 | Kikkawa | H04L 29/06027 709/217 |
| 2006/0242664 | A1 * | 10/2006 | Kikkawa | H04N 21/4627 725/37 |
| 2007/0089145 | A1 * | 4/2007 | Medford | H04N 21/222 725/81 |
| 2007/0094691 | A1 * | 4/2007 | Gazdzinski | H04N 7/17318 725/62 |
| 2007/0112932 | A1 * | 5/2007 | Min | H04L 12/2812 709/217 |
| 2009/0320073 | A1 * | 12/2009 | Reisman | G06F 17/30873 725/51 |
| 2010/0115409 | A1 * | 5/2010 | Robert | G06F 17/30979 715/716 |
| 2010/0185775 | A1 * | 7/2010 | Lee | H04L 12/2838 709/231 |
| 2010/0306411 | A1 * | 12/2010 | Zhang | H04L 12/2812 709/246 |
| 2011/0055418 | A1 | 3/2011 | Min et al. | |
| 2012/0185574 | A1 | 7/2012 | Cho et al. | |

FOREIGN PATENT DOCUMENTS

| | | |
|---|---|---|
| EP | 1612686 A1 | 1/2006 |
| KR | 10-2006-0036814 A | 5/2006 |
| KR | 10-2009-0078907 A | 7/2009 |

\* cited by examiner

FIG. 11

```
<?xml version="1.0"?>
<root xmlns="urn:schemas-upnp-org:device-1-0"
            ⋮
            ⋮

<device>

1110 ~ <videocodec> video media codec </videocode>
1115 ~ <audiocodec> audio media codec </videocodec>
        <container> container format </container>
        <codecdescription> codec level information</mcodecdescription>
        <width>horizontal pixels</width>
        <container> container format </container>
        <height>veritical pixels</height>
        <bitrate>veritical pixels</bitrate>
            ⋮
            ⋮
            ⋮

</device>
</root>
```

CONTENT OUTPUT SYSTEM AND CODEC INFORMATION SHARING METHOD IN SAME SYSTEM

BACKGROUND OF THE INVENTION

Field of the Invention

The present invention relates to a contents control system for outputting various multimedia contents and a method for sharing codec information among multimedia devices playing the multimedia contents in the system and, particularly, the present invention relates to a method for multimedia devices to share codec information per device so as play multimedia contents shared through Digital Living Network Alliance (DLNA) function.

Description of the Related Art

Recently, multimedia contents playback function is integrated into diverse devices such as smartphone, MP3, Portable Multimedia Player (PMP), Home manager, and notebook. Also, it is likely that the multimedia contents encoded with different codecs are shared among multimedia devices.

As the High Definition (HD) broadcast service is provided, the multimedia contents become large in large volume. Such multimedia contents are required to be played by portable terminals with small displays as well as television (TV). In order to accomplish this, the diverse multimedia contents scattered on the network have to be transcoded with a codec to be suitable for the corresponding multimedia playback environment in resolution and size before being transmitted to the terminals.

DISCLOSURE OF INVENTION

Technical Problem

As the multimedia contents are diversified in format, level, size, and container, the codec profiles are diversified too. There is a problem in that the multimedia contents encoded in different formats can be played by all the types of multimedia devices. If a playback signal for the multimedia content it cannot play is received, the multimedia device incurs an error and fails playing the multimedia contents.

Solution to Problem

In order to solve the above problem, a method for sharing codec information in a contents output system includes sharing, when a media server, a media renderer for outputting contents, and a control point are connected, codec information provided by the media server and the codec information of contents playable by the media renderer; and providing, at the media server, the contents to the media renderer according to the shared codec information.

In order to solve the above problem, a system for sharing codec information includes a media server which provides contents, shares, when a media server and a media renderer for outputting contents are connected, codec information provided by the media server and the codec information of contents playable by the media renderer, and provides the contents; and a media renderer which outputs the contents provided by the media server.

Advantageous Effects

According to the present invention, it becomes advantageous to share multimedia contents among the recent multimedia devices following DLNA standard. Also, it is possible to determine whether the multimedia contents encoded in various formats can be played by at least one multimedia device based on the codec information per multimedia device. Also, it is possible to check the codec supported by each multimedia device dynamically based on the previously stored information and allow each multimedia device to access the multimedia contents provided in various formats.

BRIEF DESCRIPTION OF THE DRAWINGS

FIG. 11 is a diagram illustrating the codec information transmitted to the media server according to the second embodiment of the present invention.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Terms and words used in the specification and claims must be regarded as concepts selected by the inventor as the best method of illustrating the present invention, and must be interpreted as having meanings and concepts adapted to the scope and sprit of the present invention to understand the technology of the present invention.

The contents output system includes a multimedia device for outputting the contents and a media server for providing the multimedia contents. The multimedia device is capable of playing various multimedia contents transmitted by the media server. The media server converts the multimedia contents provided by the service providers, cable operators, and Internet operators and stored its storage to the format executable by the corresponding multimedia device and then provides the converted multimedia contents to the multimedia device. Here, the media server can be a set-top box. The multimedia contents are referred to as contents hereinafter.

The multimedia device is capable of including a Media Renderer for rendering the contents provided by the media server and a Control Point for controlling the Media Renderer. The Media Renderer includes a display unit so as to output the contents like the television, computer, and portable terminal. The Control Point can be a terminal including a remote controller, a keyboard, or other input device of a portable terminal. In the case of the portable terminal including a display device and an input device, the Media Render and the Control Point can be integrated into a terminal.

The content output system is capable of sharing the multimedia contents through Digital Living Network Alliance (DLNA). The DLNA is a protocol which is capable of exchanging among the terminals operating based on the Internet Protocol (IP).

In order to share the multimedia contents through DLNA, the media server has to perform transcoding operation including conversion of codec or resolution and size to be suitable for the environments of individual terminals. A description is made of the basic transcoding procedure with reference to FIG. 1.

Figure 1:
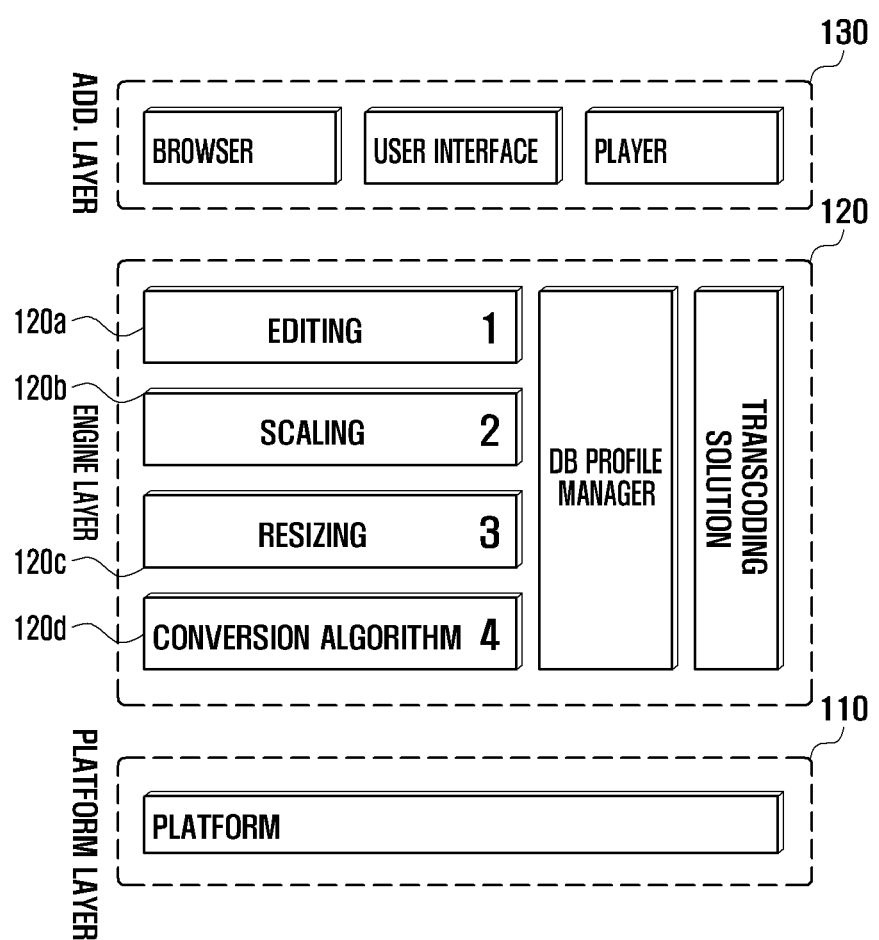
FIG. 1 is a diagram illustrating a codec conversion algorithm according to the present invention.

FIG. 1 is a diagram illustrating a codec conversion algorithm according to the present invention.

Referring to FIG. 1, the media server is capable of including a Platform Layer 110, an Engine Layer 120, and an Application (App.) Layer 130

The Platform Layer 110 means a combination of hardware and software for operating the software application programs. The Platform layer 110 is programmed to perform the functions of the connected multimedia devices.

The engine layer 120 decodes the original source received form the service provider and transcodes the decoded original source to the format suitable for the multimedia device requested for the corresponding content. That is, the media server converts the original source received from the service provider to a format of content executable by the multimedia device through the engine layer 120. At this time, the media server can convert the format of the content using the codec information per multimedia device. Here, the codec information means the information on the playable audio and video formats and size of the content.

In order to convert the content format, the engine layer 120 includes an editing block 120a, a scheduling block 120b, a resizing block 120c, a conversion algorithm 120d, a Database (DB) profile manager for managing profiles stored in the DB, and a transcoding solution for use in transcoding. The editing block 120a, scaling block 120b, resizing block 120c, and conversion algorithm 120d are described in more detail hereinafter.

The editing block is responsible for decompressing/compressing the contents, media editing, and encoding/decoding. The scaling block 120b performs Fast Packet Switching (FPS) convention and lower bitrate on the edited content and interlace/progressive conversion. The resizing block 120c converts the resolution to a format such as Common Intermediate Format (CIF), Video Graphic Array (VGA), Quarter VGA (QVGA), and Super VGA (SVGA) suitable for the multimedia device. The conversion algorithm 120d is a transcoding algorism to perform decoding, transcoding, and encoding the content in sequence.

The application layer 130 is a higher layer on which applications are running and provides contents to the connected multimedia devices. Here, the application layer 130 is capable of including a browser, a user interface, and a player.

The present invention proposes a method for sharing the codec information between the media renderer and the media server for outputting the contents in the contents output system. The first embodiment proposes a method for matching, at the control point, the codec informations between the media server and the media renderer and sharing the codec information between the media server and the media render according to the matching result. In more detail, when the control point, the media server, and the media renderer are connected, the control point receives the codec information of the contents provided by the media server and the codec information of the playable contents from the media renderer. In response to the convention request from the control point, the media server is capable of converting the convention to the corresponding format using the codec information of the contents playable by the media renderer.

The second embodiment proposes a method for storing the codec information of the contents playable by the individual multimedia devices connected to the media server in advance. In more detail, the media server stores the codec information transmitted by the media renderer as the multimedia device to play the contents. When content format conversion is required, the media server converts the contents to the format playable by the corresponding multimedia device using the previously stored codec information and transmits the converted content to the multimedia device. At this time, the codec information stored in the media server includes the codec, codec level, container, horizontal size, vertical size, resolution, etc. The codec information also includes the default value supported by the multimedia devices connected to the media server and optional information such as identity information for identifying the multimedia devices.

Figure 2:
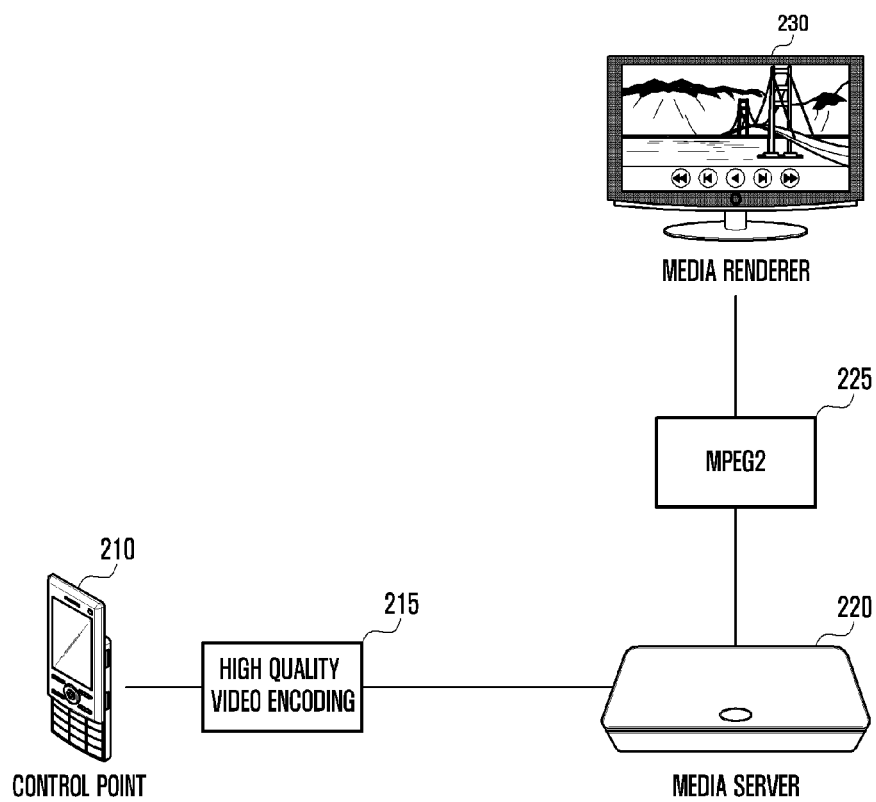
FIG. 2 is a diagram illustrating the contents output system of a home network environment according to the present invention.

FIG. 2 is a diagram illustrating the contents output system of a home network environment according to the present invention.

Referring to FIG. 2, the content control system includes a control point 210, a media server 220, and a media renderer 230. Here, it is assumed that the contents control system is capable of sharing the contents through DLNA. Also, the description is made under the assumption that the media server 230 is a home set-top box, the control point 210 a mobile terminal, and the media renderer 230 a television.

The mobile terminal as the control point 210 is capable of playing the contents received from the set-top box in Advanced Video Coding (AVC) format. The control point 210 is also capable of supporting remote control function in wireless connection with the media renderer 230.

The television as the media renderer 230 is capable of playing the contents received from the set-top box in Moving Picture Experts Group 2 (MPEG2) format 225.

According to the first embodiment, the control point 210 is connected to the media renderer 230 and the media server 220 through DLNA. The control point 210 receives the codec information about the contents playable by the media renderer 230 and the codec information about the contents provided by the media server 220. The control point 210 also determines whether the codec informations transmitted by the media renderer 230 and the media server 220 match with each other. If the codec informations match, the control point 210 requests the media server 220 for the contents format conversion such that the media renderer 230 is capable of playing the corresponding contents. In response to the request, the content server 220 converts the contents to the forma playable by the media renderer 230. The converted contents are transmitted to the media renderer 230 through the control point 210.

According to the second embodiment, the control point 210 and the media renderer 230 establish DLNA connection with the media server to show the list of the contents to be played. In the case that there is a multimedia device connection through Universal Plug and Play (UPnP) in the home network, if a new control point 210 enters, Simple Service Discovery Protocol (SSDP) message is broadcast. The SSDP message is received, the multimedia device transmits to the control point 210 a response message including an extensible markup language (xml) document describing itself. At the time when the DLNA connection is established, the media server 220 determines whether the multimedia device is of being initially connected or previously registered to update the database. If the corresponding multimedia device is of being initially connected, the media server 220 adds the codec information transmitted by the multimedia device to the database as a new field.

After collecting the codec information of the multimedia device, the media server 220 configures a default value of the corresponding multimedia device with priority. For example, if the multimedia device supports Motion Picture Experts Group 4 (MPEG4), Motion Picture Experts Group 2 (MPEG2), and AVC, the media server 220 designates one of the MPEG4, MPEG2, and AVC as the default value of the codec information related to the corresponding multimedia device. The media server 220 is capable of converting the contents using the default value. For example, if the control point 210 commands to play content encoded with the codec which is not playable by the media renderer 230, the media renderer 230 transmits an error message to the control point 210. In response to the error message, the control point 210 requests the media server 220 to convert the content to the format playable by the media renderer 230. In response to the request, the media server 220 checks the codec information stored in the database and converts the content to the format playable by the media renderer 230. The converted content is transmitted to the media renderer 230 via the control point 210.

Figure 3:
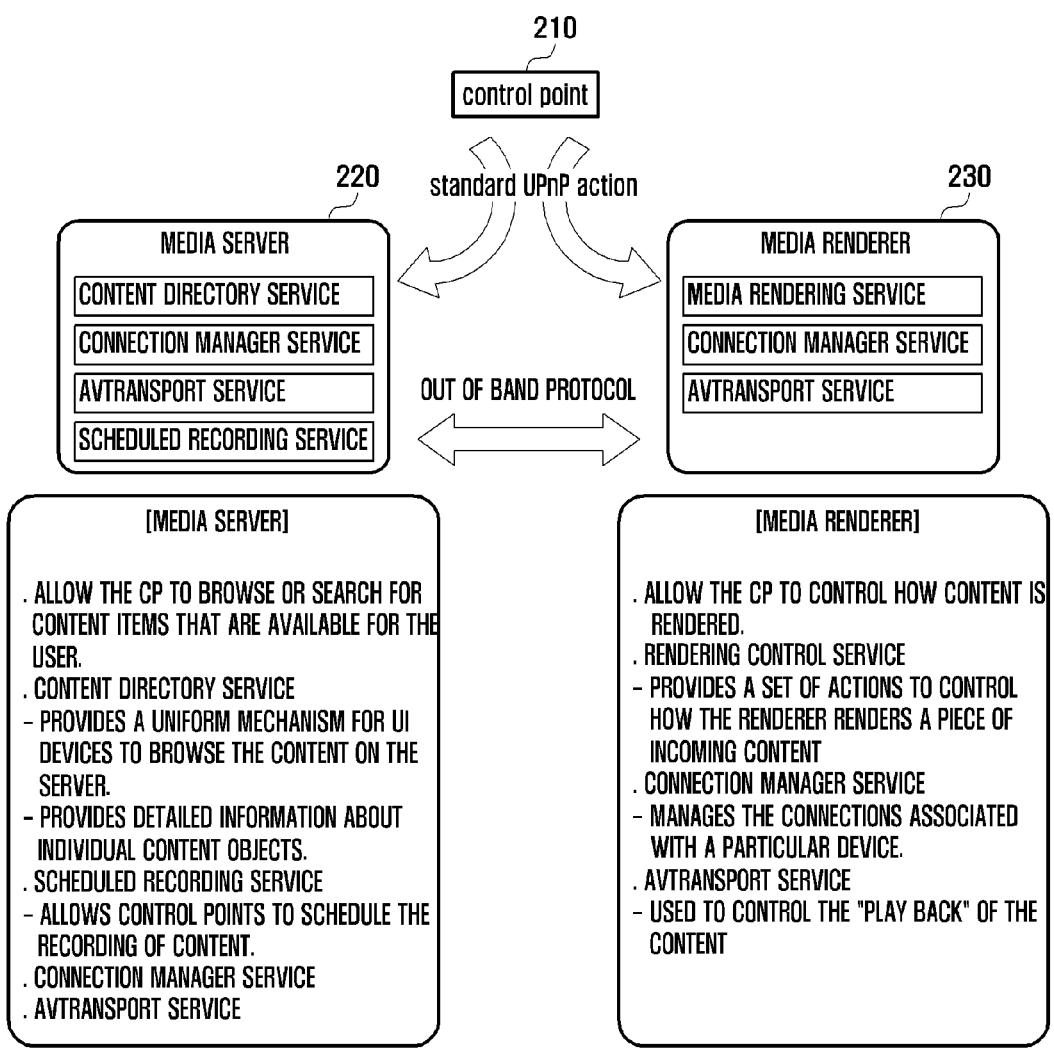
FIG. 3 is a diagram illustrating a service provided by the contents control system according to the present invention.

FIG. 3 is a diagram illustrating a service provided by the contents control system according to the present invention.

Referring to FIG. 3, the contents control system includes a Control Point 210, a Media server 220 for providing contents, and a Media renderer 230 for outputting the contents.

The control point 210 is connected to the media server 220 and the media renderer 230 through Universal Plug and Play (UPnP) protocol standard. The media server 220 and the media renderer 230 are connected through a band protocol to transmit the contents.

The media server 220 allows the user to browse or search for content items by means of the control point (CP) 210. The media server 220 provides content directory service, connection manager service, AV Transport service, and scheduled recording service.

The content directory service provides the Uniform mechanism for browsing the contents provided by the server of the service provider. That is, the content directory service allows the user to search and browse for available content items by means of the control point 210. The scheduled recording service allows for the control point 210 to schedule recording the contents.

The media renderer 230 is connected to the control point (CP) 210 for rendering contents. Here, the media renderer 230 provides the media rendering service, connection manager service, and AV Transport service. The media rendering service provides a set of processes for controlling the received content. The connection manager service manages the connection with multiple terminals. The AV Transport service controls the playback of contents.

Figure 4:
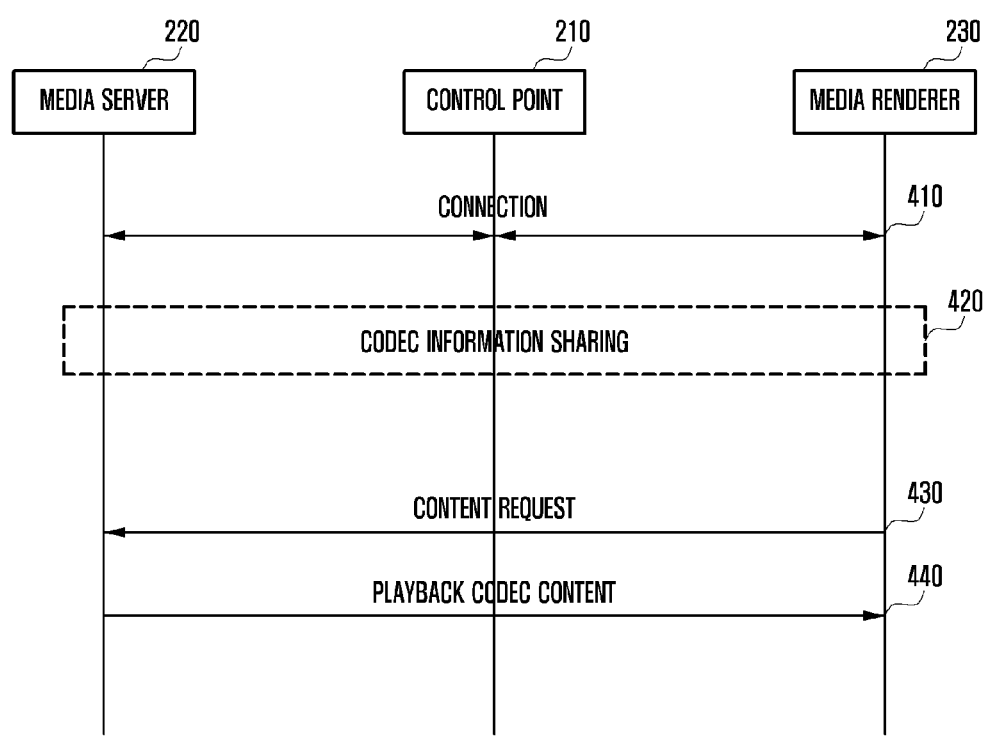
FIG. 4 is a signaling diagram illustrating a method for sharing codec information in the contents output system according to the present invention.

A description is made of signal flows for sharing the contents in the content control system with reference to FIG. 4.

FIG. 4 is a signaling diagram illustrating a method for sharing codec information in the contents output system according to the present invention.

Referring to FIG. 4, the control point 210, the media server 220, and the media renderer 230 are connected through DLNA links at step 410. The media server 220 and the media renderer 220 share the codec information at step 420. The method for sharing the codec information between the media server 220 and the media renderer 230 can be implemented in two ways as follows. The first embodiment proposes a method for sharing the codec information in such a way that the control point 210 checks the codec information of the contents provided by the media server 220 and the codec information of the contents playable by the media renderer 230. The second embodiment proposes a method for sharing the codec information in such a way that the media server 220 stores the codec information of the contents playable by the media renderer 230 in advance.

Once the codec informations are shared through the method of one of the first and second embodiments, the media renderer 230 requests the media server 220 for the content selected by the user. In response to the request, the media server 220 provides the media renderer 230 with the requested content encoded with the codec supported by the media renderer 230 at step 440.

A description is made of the embodiments of the method for sharing the codec information with reference to FIGS. 5 to 12.

Figure 5:
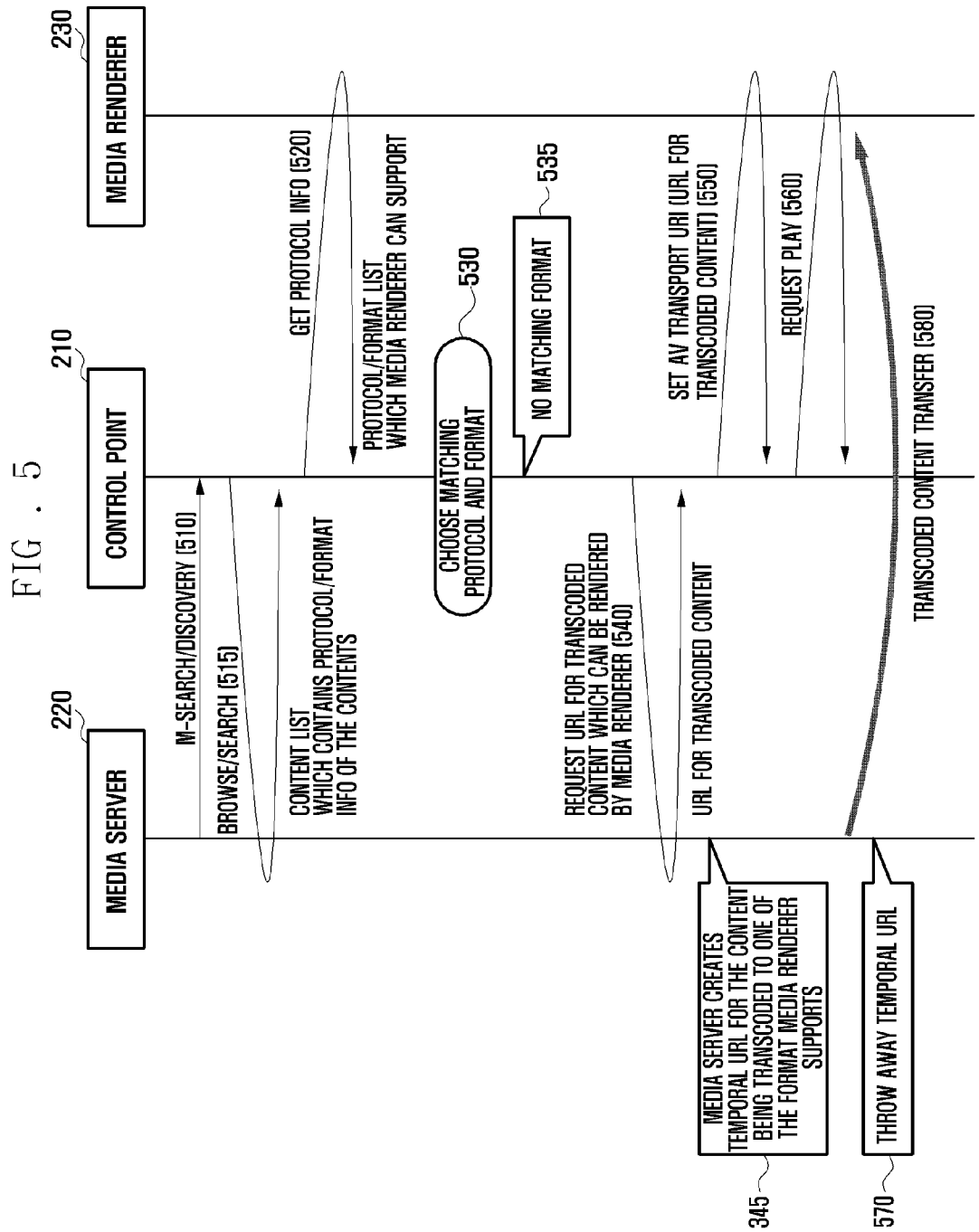
FIG. 5 is a signaling diagram illustrating signal flows in the contents output system for controlling the contents according to the first embodiment of the present invention.

FIG. 5 is a signaling diagram illustrating signal flows in the contents output system for controlling the contents according to the first embodiment of the present invention.

Referring to FIG. 5, the media server 220 and the media renderer 230 establish DLNA connection in order for the user to check the list of the contents playable. For example, if a new control point 210 enters into home where the media renderer 230 is connected through UPnP, it broadcasts a Simple Service Discovery Protocol (SSDP) message. If the SSDP message is received, the media renderer 230 sends an extensible markup language (xml) document describing itself. Here, the xml document includes the codec information. The codec information is the detail on the contents supported by the media renderer 230 and the media server 220 and includes information on the codec and size.

The media server 220 stores the contents transmitted by the external service provider such as broadcasters or other terminal. At this time, the contents stored in the multimedia server 220 are stored without consideration on whether the contents can be played by the multimedia devices such as media renderer 230 connected to the media server 220.

The media server 220 performs M-search to establish the connection to the control point at step 510. The control point 210 performs browsing and searching to receive a content list of the contents provided by the media server 220 at step 515. The contents list includes the protocol and forma information about the provided contents. The control point 210 also acquires the protocol information from the media renderer 230 at step 520. That is, the control point 210 receives the information on the codec related to the supportable contents from the media renderer. Here, the codec information includes a list of contents formats and protocols supportable by the media renderer 230.

Next, the control point 210 matches the protocols and codecs supported by the media renderer 230 to the content list provided by the media server 220 at step 530. If the contents protocol and codecs supported by the media renderer 230 do not match to the contents formats provided by the media server 220, the control point 210 transmits a Uniform Resource Locator (URL) request signal for the converted contents playable by the media renderer 230 at step 540. At this time, the control point 210 transmits to the media server 220 the information on the supportable contents formats of the media renderer along with the URL request signal.

If the URL request signal is received, the media server 220 transcodes the contents to one of the formats supported by the media renderer 230 at step 545. Next, the media server creates an instant URL for the converted contents. The media server transmits the information on the URL for the converted contents to the control point 210.

The control point 210 configures an Audio/Video (AV) Uniform Resource Identifier (URI) corresponding to the URL for the contents transmitted by the media renderer 230 and the media server 220 at step 550. The control point 210 transmits a content playback request signal to the media renderer in response to a user input at step 560.

The media renderer 230 and the media server 220 are connected with each other through a band protocol. The media renderer 230 forwards the content playback request signal received from the control point 210 to the media server 220. The media server 220 transmits the converted contents to the media renderer 230 through the instant URL at step 580. That is, the instant URL created by the media server 220 is used to transmit the contents in formats that can be rendered by the media renderer 230. The control point 210 notifies the media renderer 230 that the contents transmitted through the instant URL can be rendered by the media renderer 230. The media renderer 230 opens a transmission port using the URL created for the format-converted contents and requests the media server 220 for the playback of the corresponding content. The media renderer 230 outputs the contents received from the media server 220.

Figure 6:
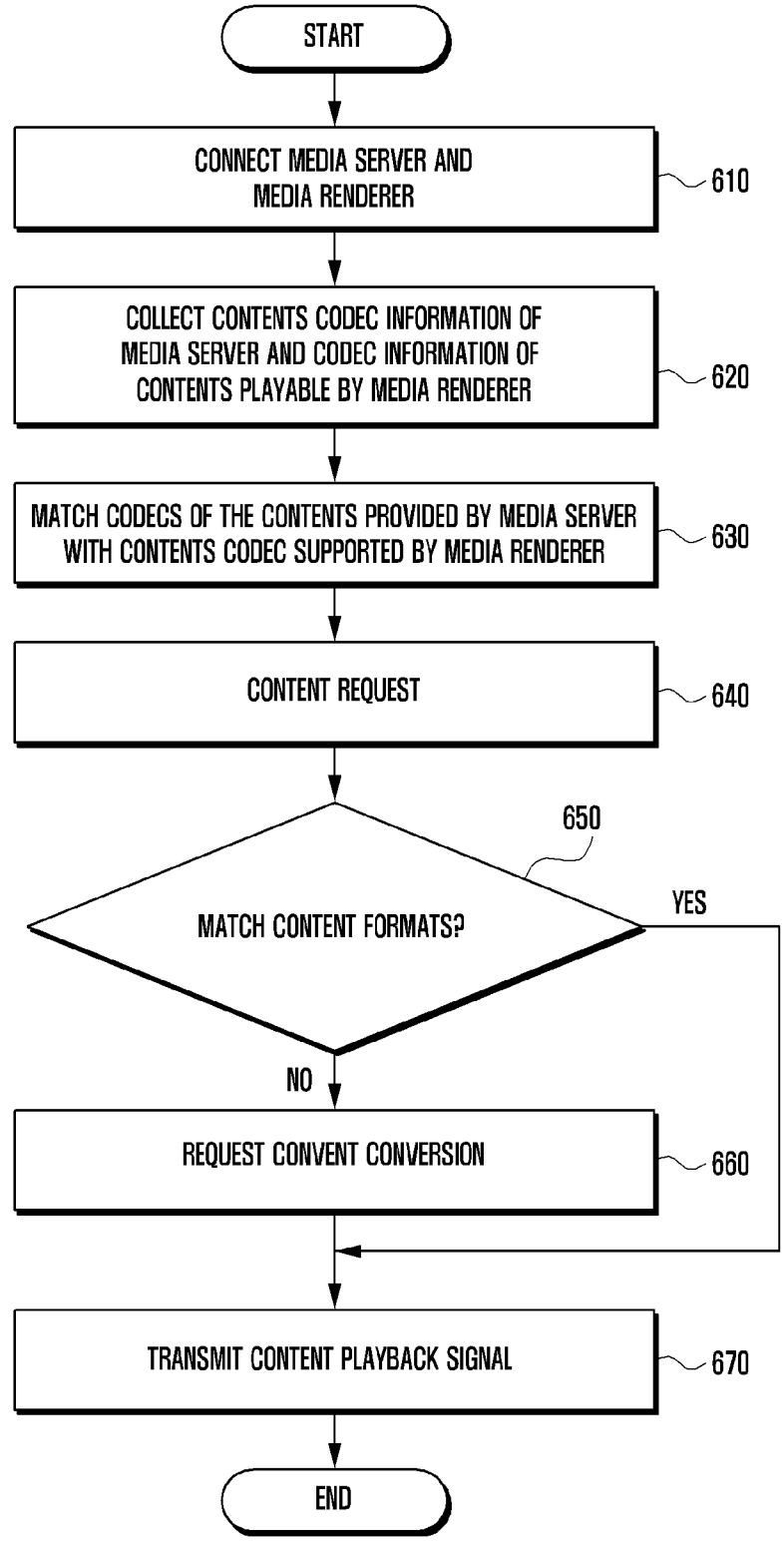
FIG. 6 is a flowchart illustrating a content control method of the control point according to the first embodiment of the present invention.

FIG. 6 is a flowchart illustrating a content control method of the control point according to the first embodiment of the present invention.

Referring to FIG. 6, the control point 210 connects to the media server 220 and the media renderer 230 at step 610. The control point 210 collects the codec information of the contents provided by the media server and the codec information of the contents supported by the media renderer 230 at step 620. Next, the control point 210 matches the codecs of the contents provided by the media server 220 with the contents codec supported by the media renderer 230 at step 630.

The control point 210 determines whether the codecs of the media server 220 are matched with the codecs supported by the media renderer 230 at step 640. If the codecs of the media server 220 and the media renderer 230 do not match, the control point 210 transmits a format conversion request signal to the media server 220 at step 650. At this time, the control point transmits the supportable codec information to the media server 220 along with the request signal. The control point 210 transmits a content playback signal to the media server 220 and the media renderer 230 in response to the user selection at step 660.

Figure 7:
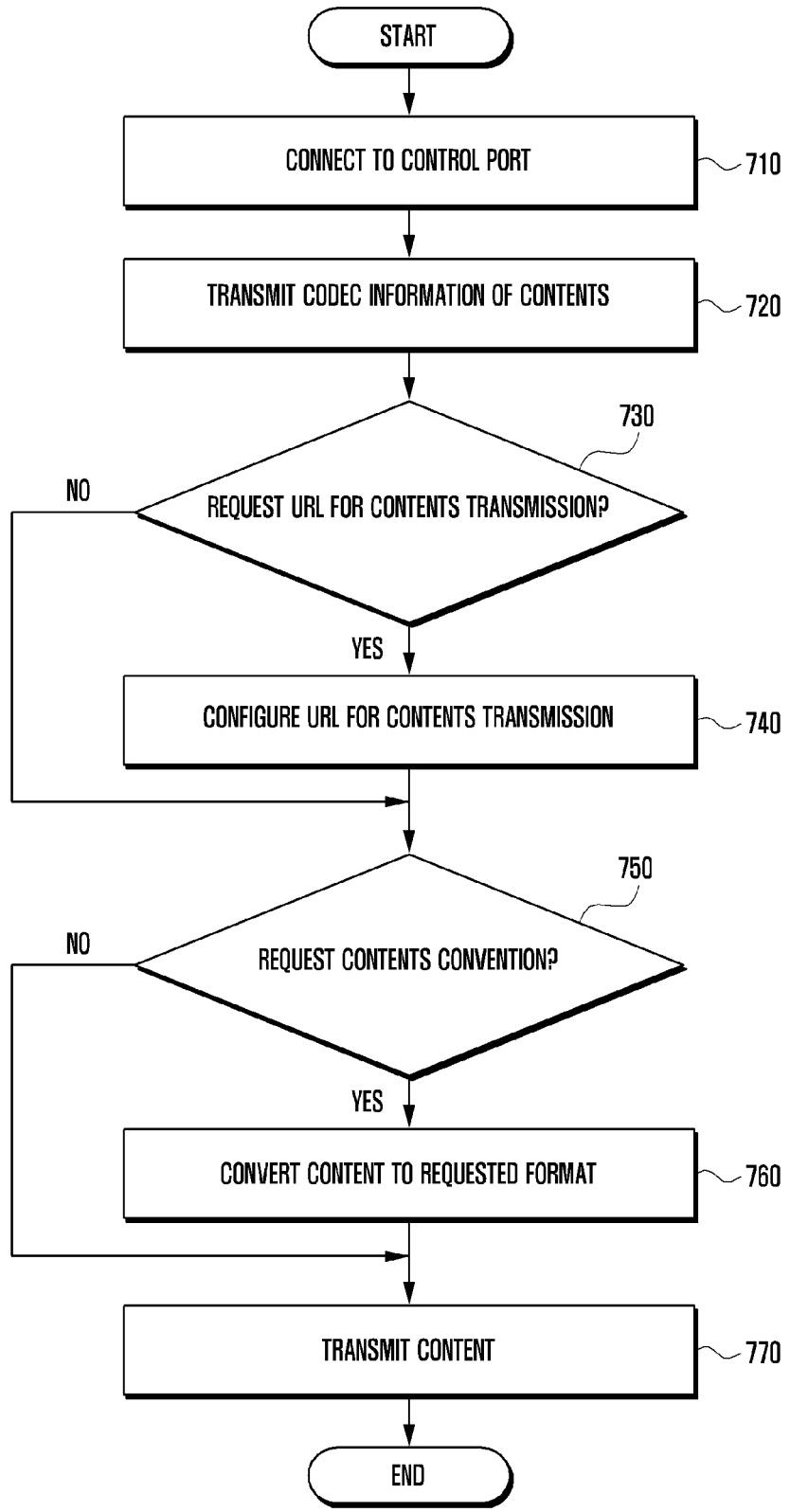
FIG. 7 is a flowchart illustrating the content control method of the media server according to the first embodiment of the present invention.

FIG. 7 is a flowchart illustrating the content control method of the media server according to the first embodiment of the present invention.

Referring to FIG. 7, the media server 220 connects to the control point 210 at step 710 and transmits to the control point 210 the codec information of the contents to be provided at step 720. The media server 220 determines whether there is a URL request from the control point 210 at step 730. If there is URL request, the media server 220 creates a URL for contents transmission at step 740. Although not depicted in drawing, the media server 220 and the media renderer 230 establishes a band protocol connection for contents transmission according to the arbitration of the control point 210.

Next, the media server 220 determines whether the control point 210 requests for contents conversion at step 750. If the contents conversion is requested, the media server 220 converts the contents to the requested format at step 760. In more detail, the control point 210 transmits to the media server 220 the codec information including the information on the codecs supported by the media renderer for playing the contents. The media server 220 checks the received codec information and converts the contents to the format corresponding to the checked codec information. The media server 220 transmits the converted contents to the media renderer 230 at step 770. At this time, if it is impossible to convert the format of the contents, the media server 220 requests the contents server for the codec conversion. This algorithm can be used in a virtual server using the transcoding module supporting such transcoding as well as the media server 220.

Hereinabove, the description has been directed to the method for providing the contents in such a way that the control point 210 matches the codecs of the contents provided by the media server 220 and the contents codecs supported by the media renderer 230 to share the codec information. A method for sharing the codec information in such a way that the media server 220 stores the information on the contents codecs supported by the media render 230 in advance.

Figure 8:
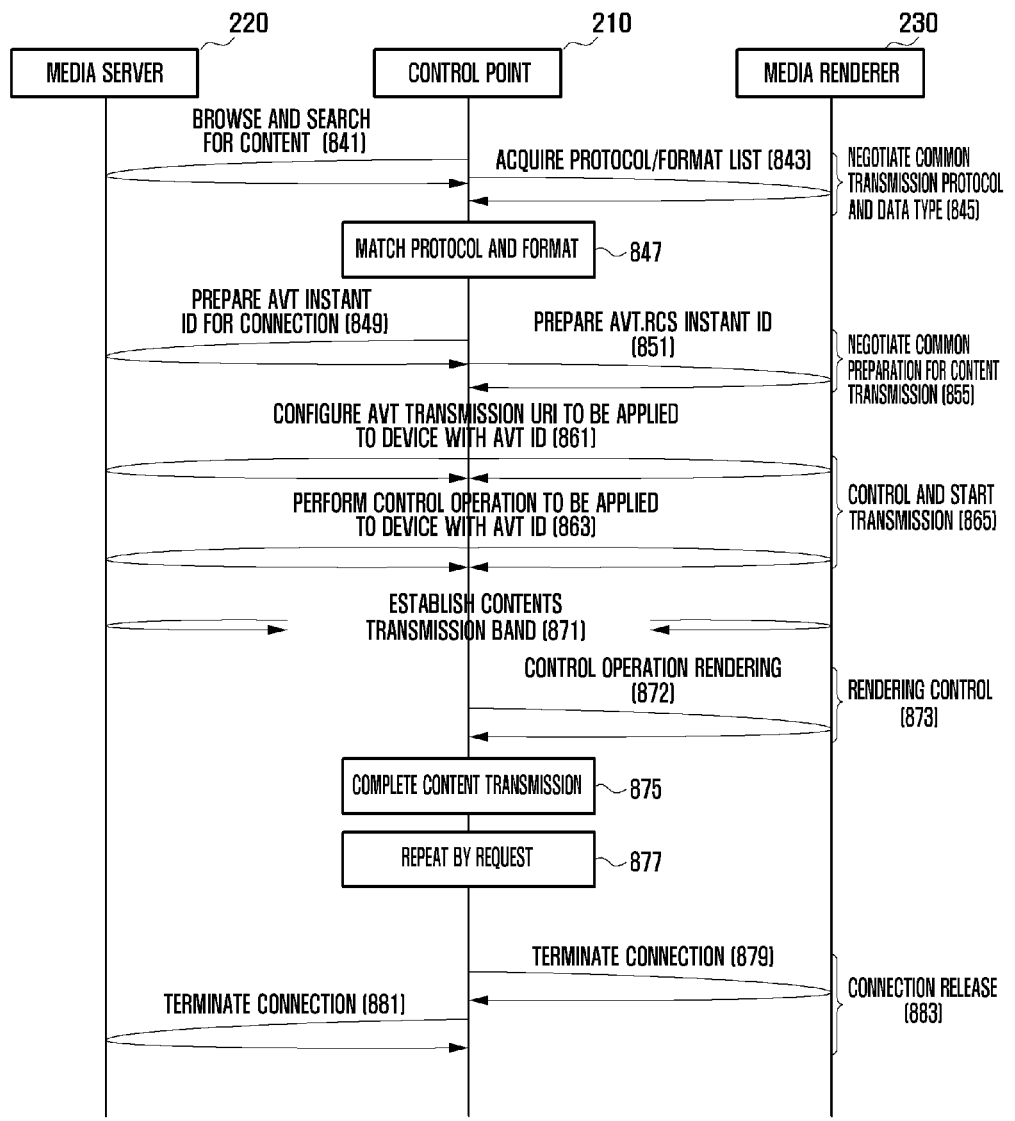
FIG. 8 is a signaling diagram illustrating signal flows in the contents control system for sharing the codec information according to the second embodiment of the present invention.

FIG. 8 is a signaling diagram illustrating signal flows in the contents control system for sharing the codec information according to the second embodiment of the present invention.

Referring to FIG. 8, the control point 210 transmits a content request signal to the media server 220 at step 841. Upon receipt of the content request signal, the media server 220 browses or searches for the content requested by the control point 210 and transmits the retrieved content to the control point 210. The control point 210 acquires the protocol information and format list from the media renderer 230 at step 843. That is, the control point 210, the media server 220, and the media renderer 230 negotiate the common transmission protocol and data type at step 845.

Next, the control point 210 selects the matched protocol and format at step 847. Next, the control point requests for preparing Audio/Video Transport (AVT) Instance ID to connect to the media renderer 230 at step 851. That is, the control point 210, the media server 220, and the media renderer 230 prepare the content transmission at step 855.

Among the control point 210, the media server 220, and the media renderer 230, the AVT transport URI to be applied to a terminal having the AVT ID is configured at step 861 using an Instant IE prepared at steps 847 and 849. The control point 210, the media server 220, and the media renderer 230 perform control operations applied to one terminal having the AVT ID at step 963. That is, the control point 210, the media server 220, and the media renderer 230 perform transmission control and initiation.

Through the above steps, the media server 220 and the media renderer 230 establishes a content transport band at step 871. Next, the control point 210 and the media renderer 230 render the control operation for controlling the contents at step 872. That is, the control point 210 and the media renderer 230 perform rendering control at step 873.

Next, if the content transmission has completed at step 875, the control point 210 is capable of repeating the previous steps in response to the user request at step 877. That is, the control point 210 is capable of requesting the media server 220 to transmit a specific content to the media renderer 230 in response to a user request at step 877. The control point 210 is also capable of transmitting a signal input for controlling playback of the content to the media renderer 230.

The connection between the control point 210 and the media renderer 230 is released after the completion of the content playback or in response to the user command at step 879. At this time, the connection between the media server 220 and the control point 210 is released too at step 881. That is, once the content transmission has completed, the connections between the control point 210 and the media server 220 and the media renderer 230 at step 883.

As described with reference to FIG. 8, when the content is requested, the control point 210 exchanges the codec information related to the contents playable by the corresponding multimedia device for sharing the information between the media renderer 230 and the media server 220. Before playing the contents using the control point 210, each multimedia device establishes a physical connection using Addressing, Discovery, Description, Control, Eventing, and Presentation messages used in the UPnP. The information exchanged between the multimedia devices includes vendor-specific information. The information exchanged between multimedia devices includes the corresponding multimedia device name, manufacturer, model number, and serial number.

In order to share the contents among the components constituting the contents control system, it is necessary for the media server 220 to know the codec information of the contents. For this purpose, the media server 220 stores the codec information transmitted by individual multimedia devices in the form of a data base. A description is made of the method for storing the codec information in the media server 220 with reference to FIG. 9.

Figure 9:
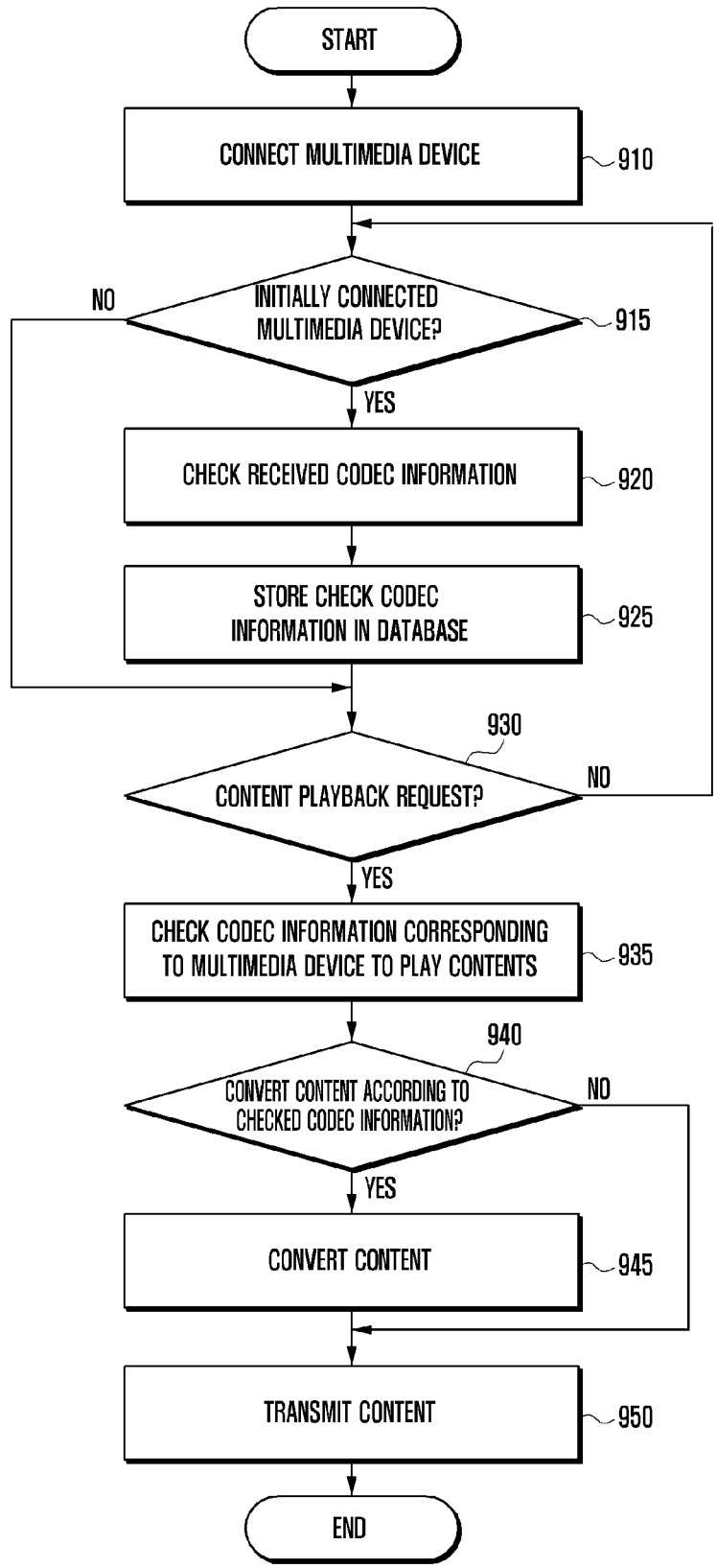
FIG. 9 is a flowchart illustrating a method for providing contents using the codec information stored in the media server according to the second embodiment of the present invention.

FIG. 9 is a flowchart illustrating a method for providing contents using the codec information stored in the media server according to the second embodiment of the present invention.

Referring to FIG. 9, the media server 220 connects to at least one of the media renderer 230 as a multimedia device requesting for connection and the control point 210 at step 910. At this time, the media server 220 determines whether it is the first connection of the multimedia device at step 915. If it is the first connection of the multimedia device, the media server 220 checks the codec information received from the multimedia device at step 920. The media server 220 stores the checked codec information in the data base at step 925. Here, the codec information includes the content formats and contents sizes supported by the multimedia device. If it is not the first connection of the multimedia device, the media server 220 performs step 930.

The media server 220 determines whether a content playback request is received from the connected multimedia device at step 930. If the content playback request is received, the media server 220 checks the codec information corresponding to the multimedia device to play the content by referencing the database at step 935.

Next, the media server 220 determines whether it is required to convert the content based on the checked codec information at step 940. That is, the media server 220 compares the codec information of the content requested by the multimedia device and the codec information retrieved from the database to determine whether to convert the content.

If it is required to convert the content, i.e. if the codec supported by the multimedia device and the codec applied to the content to be provided do not match with each other, the media server 220 converts the content at step 945. Next, the media server 220 transmits the converted content to the multimedia device at step 950. Otherwise, if the codec supported by the multimedia device and the codec applied to the content to be provided match with each other, i.e. it is not required to convert the content, the media server 220 performs step 950.

Hereinabove, the description has been directed to the method providing the contents in such a way that the media server 220 storing the codec information about the contents playable by the multimedia device converts the content to the format supported by the multimedia device and transmits the converted format to the multimedia device. A description is made of the method for transmitting the codec information about the contents to the media server 220 hereinafter.

Figure 10:
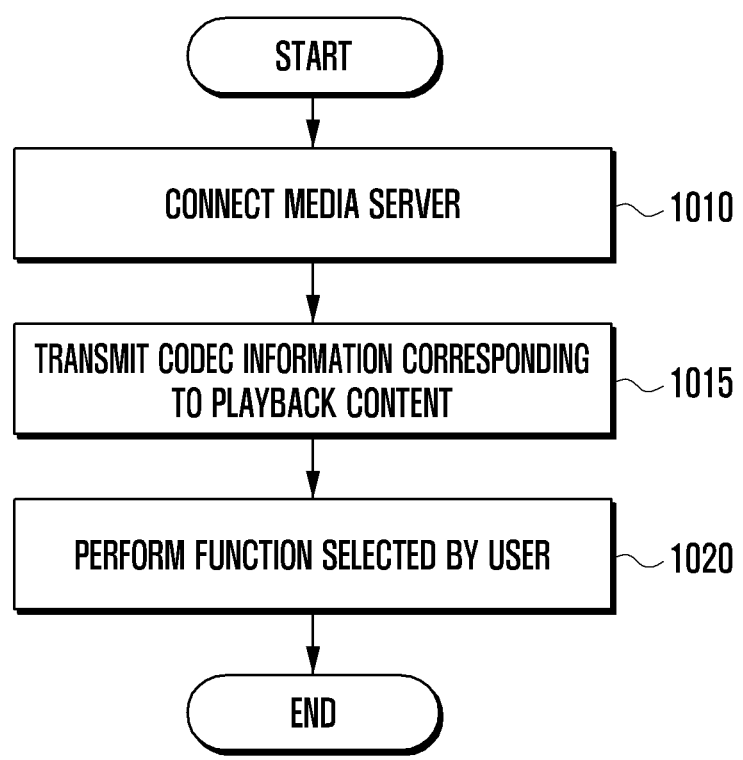
FIG. 10 is a flowchart illustrating a method for transmitting the codec information supported by the multimedia device according to the second embodiment of the present invention.

FIG. 10 is a flowchart illustrating a method for transmitting the codec information supported by the multimedia device according to the second embodiment of the present invention.

Referring to FIG. 10, the multimedia device connects to the media server 220 according to the user selection at step 1010. The multimedia device transmits the codec information of the contents it can play to the media server 220 at step 1015. The codec information includes information about the video and audio formats and size of the contents that multimedia device supports. A description is made of the codec information later with reference to FIG. 11.

Next, the multimedia device performs the function selected by the user at step 1020. For example, if the multimedia device is the media renderer 230 for outputting the content, the multimedia device is capable of outputting the contents transmitted by the media server 220. If the multimedia device is the control point 210 for controlling the media renderer 230, the multimedia device transmits the signal input by the user to the media renderer 230 or the media server 220.

FIG. 11 is a diagram illustrating the codec information transmitted to the media server according to the second embodiment of the present invention.

Referring to FIG. 11, the codec information transmitted from the multimedia device to the media server 220 includes the information on the video codec 1110 and the audio codec 1115. In the case that the media server 220 and the multimedia device are connected through DLNA, the multimedia device is capable of transmitting the codec information to the media server 220 in the form of Hyper Text Markup Language (HTML) through IP. That is, the multimedia device is capable of transmitting the codec information in the HTML format as shown in FIG. 11.

Figure 12:
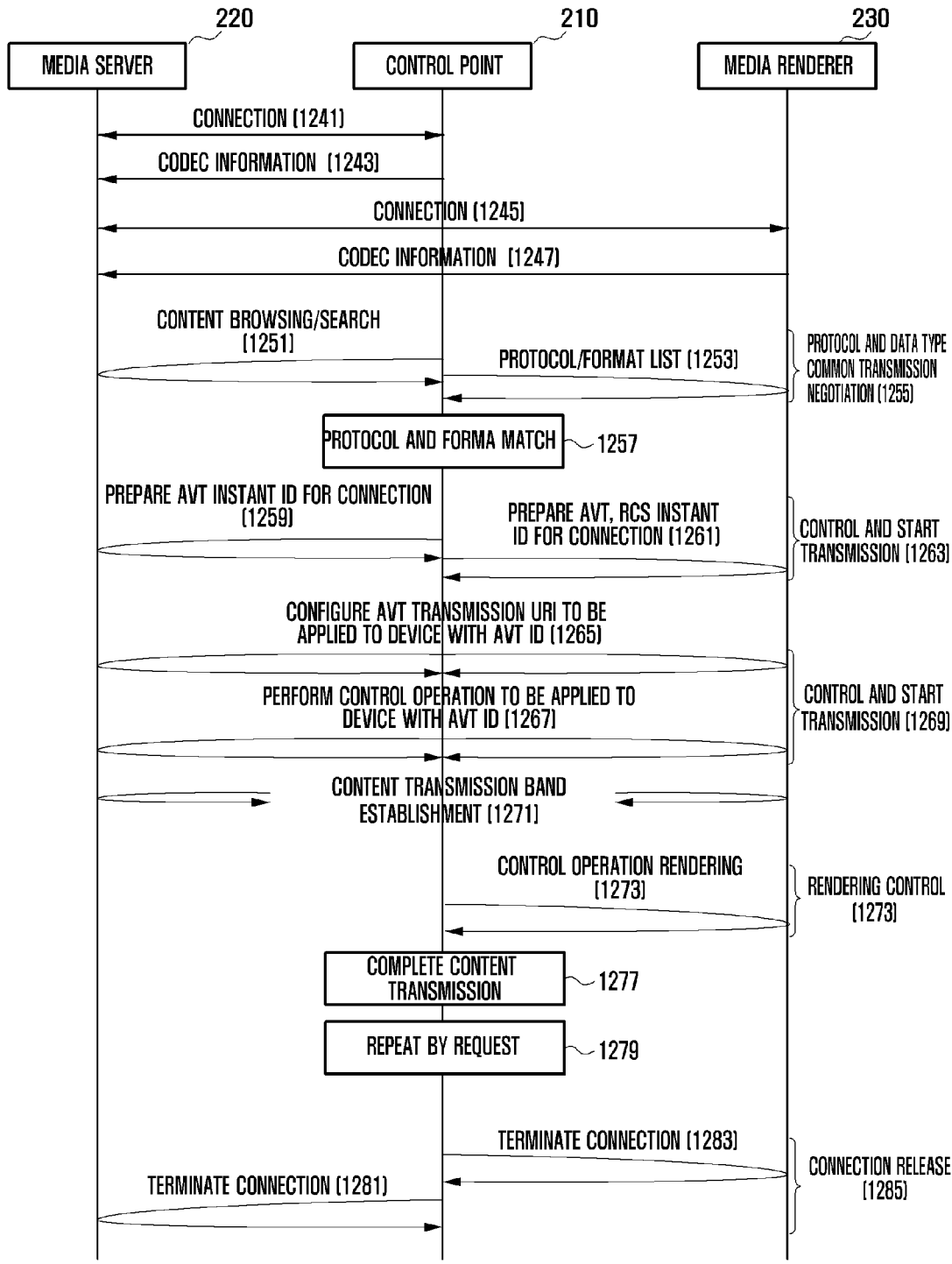
FIG. 12 is a signaling diagram illustrating signal flows for sharing the codec information in the contents control system including multiple multimedia devices according to the second embodiment of the preset invention.

FIG. 12 is a signaling diagram illustrating signal flows for sharing the codec information in the contents control system including multiple multimedia devices according to the second embodiment of the preset invention.

Referring to FIG. 12, the media server 220 and the control point 210 establish a connection for data transmission at step 1241. At this time, if it is a terminal capable of outputting the content such as mobile terminal, the control point 210 transmits the codec information of the contents it can play to the media server 220 at step 1243. If it is connected to the media server 220 at step 1245, the media renderer 230 also transmits the codec information of the content it can play at step 1247. Although it is depicted that the control point 210 and the media renderer 230 are separately implemented, the present invention is not limited thereto. The control point 210 and the media renderer 230 can be integrated into a single terminal. That is, in the case of the terminal including a display unit capable of outputting the contents and an input unit capable of receiving user input, the control point 210 and the media renderer 230 can be implemented in a single terminal.

All multimedia devices connected to the media server 220 send the media server 220 the codec information of the contents they can play. The multimedia server 220 sorts the codec informations per multimedia device so as to be stored in the form of a database. The media server 220 transmits the contents to each multimedia device in the format supported by the multimedia device by referencing the previously stored codec information. Afterward, the media server 220, the control point 210, and the media renderer 230 perform steps 1251 to 1258 that are identical with steps 841 to 883 of FIG. 8.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for sharing codec information in a control point for contents output, comprising:
receiving, at the control point, from a media server, first codec information of contents provided by the media server;
receiving, at the control point, from a media renderer, second codec information indicating characteristics of contents playable by the media renderer;
comparing, at the control point, the first codec information with the second codec information; and
transmitting, at the control point, a request for converting the contents provided by the media server, based on the comparing, and the second codec information to the media server,
wherein the codec information comprises information on playable audio and video formats and size of contents, and
wherein the requested converting of the contents provided by the media server comprises transcoding a decoded original source of the contents provided by the media server to a format of contents according to the second codec information.

2. The method of claim 1, wherein the transmitting of the request for converting the contents comprises:
requesting, to the media server, a Uniform Resource Identifier (URI) for the converted contents; and
configuring, when the URI is received from the media server, the URI with the media renderer.

3. The method of claim 1, wherein the codec information further comprises at least one of codec, codec level, container, horizontal size, vertical size, resolution, default value supported per media render, and identity information for identifying the media renderer.

4. A method for sharing codec information in a media server for contents output, comprising:
storing, if second codec information of contents playable by a media renderer is received, the second codec information in a database;
comparing, if a contents request for contents provided by the media server is received from the media renderer, first codec information of the requested contents with the stored second codec information; and
converting, based on the comparing, the requested contents according to the stored second codec information,
wherein the codec information comprises information on playable audio and video formats and size of contents, and
wherein the converting of the requested contents comprises transcoding a decoded original source of the requested contents to a format of contents according to the second codec information.

5. The method of claim 4, wherein the storing of the second codec information comprises:
determining whether the media renderer is a newly connected device; and
storing, when the media render is the newly connected device, the second codec information transmitted by the media renderer in the data base.

6. A method for sharing codec information in a media server for contents output, comprising:
transmitting first codec information, of contents provided by the media server, to a control point;
identifying whether a request, for converting the contents provided by the media server and including second codec information of contents playable by a media renderer, is received from the control point;
converting the contents provided by the media server based on the second codec information if the request for converting the contents is received; and
providing the converted contents to the media renderer,
wherein the codec information comprises information on playable audio and video formats and size of contents, and
wherein the converting of the contents provided by the media server comprises transcoding a decoded original source of the contents provided by the media server to a format of contents according to the second codec information.

7. The method of claim 6, further comprising:
receiving, from the control point, a request of a Uniform Resource Identifier (URI) for transmitting contents;
configuring the URI according to the request; and
providing the converted contents to the media renderer through the configured URI.

8. A system for sharing codec information, comprising:
a media server for providing contents;
a media renderer for outputting the contents; and
a control point configured to:
receive first codec information of contents provided by the media server and second codec information of contents playable by the media renderer, compare the first codec information with the second code information,
and
transmit a request, for converting the contents provided by the media server, based on the comparing, and the second codec information, wherein the codec information comprises information on playable audio and video formats and size of contents, and wherein the converting of the contents provided by the media server comprises transcoding decoded original source of the contents provided by the media server to a format of contents according to the second codec information.

9. The system of claim 8,
wherein the control point is further configured to request the media server for a Uniform Resource Identifier (URI) for transmitting the converted contents, and configure the URI with the media renderer if the URI is received from the media server, and
wherein the media server transmits the converted contents to the media renderer through the configured URI.

10. A system for sharing codec information, comprising:
a media renderer configured to output contents;
a media server configured to:
  receive second codec information of contents playable by the media renderer,
  store, if the media server receives the second codec information from the media renderer, the second codec information in a database,
  compare, if a contents request for contents provided by the media server is received from the media renderer, first codec information of the requested contents with the stored second codec information, and
  convert, based on the comparing, the requested contents according to the stored second codec information, wherein the codec information comprises information on playable audio and video formats and size of the contents, and wherein the converting of the requested contents comprises transcoding decoded original source of the contents provided by the media server to a format of contents according to the second codec information.

11. The system of claim 10, wherein the media server is further configured to determine whether the media renderer is a newly connected device and stores, when the media render is the newly connected device, the second codec information in the data base.

12. The system of claim 10, wherein the codec information further comprises at least one of codec, codec level, container, horizontal size, vertical size, resolution, default value supported per media render, and identity information for identifying the media renderer.

* * * * *